US012033367B2

United States Patent
Nguyen et al.

(10) Patent No.: US 12,033,367 B2
(45) Date of Patent: *Jul. 9, 2024

(54) AUTOMATED CATEGORIZATION AND ASSEMBLY OF LOW-QUALITY IMAGES INTO ELECTRONIC DOCUMENTS

(71) Applicant: BANK OF AMERICA CORPORATION, Charlotte, NC (US)

(72) Inventors: Van Nguyen, Plano, TX (US); Sean Michael Byrne, Tampa, FL (US); Syed Talha, McKinney, TX (US); Aftab Khan, Richardson, TX (US); Beena Khushalani, Moorpark, CA (US); Sharad K. Kalyani, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,014

(22) Filed: Aug. 29, 2023

(65) Prior Publication Data
US 2023/0410462 A1 Dec. 21, 2023

Related U.S. Application Data

(63) Continuation of application No. 17/306,495, filed on May 3, 2021, now Pat. No. 11,798,258.

(51) Int. Cl.
*G06V 10/46* (2022.01)
*G06F 16/93* (2019.01)
(Continued)

(52) U.S. Cl.
CPC ............ *G06V 10/464* (2022.01); *G06F 16/93* (2019.01); *G06F 40/20* (2020.01); *G06N 20/00* (2019.01);
(Continued)

(58) Field of Classification Search
CPC .......... G06F 16/93; G06F 40/20; G06N 20/00
See application file for complete search history.

(56) References Cited

U.S. PATENT DOCUMENTS 7,570,816 B2  8/2009  Bargeron et al.
7,574,409 B2  8/2009  Patinkin
(Continued)

OTHER PUBLICATIONS

Van Nguyen; Automated Categorization and Assembly of Low-Quality Images Into Electronic Documents; U.S. Appl. No. 17/306,374, filed May 3, 2021.

*Primary Examiner* — Edward Park

(57) ABSTRACT

An apparatus includes a memory and processor. The memory stores document categories, text generated from an image a physical document page, and a machine learning algorithm. The machine learning algorithm is configured to extract features associated with natural language processing and features associated with the text. The machine learning algorithm is also configured to generate a feature vector that includes the first and second pluralities of features, and to generate, based on the feature vector, a set of probabilities, each of which is associated with a document category and indicates a probability that the physical document from which the text was generated belongs to that document category. The processor applies the machine learning algorithm to the text, to generate the set of probabilities, identifies a largest probability, and assigns the image to the associated document category.

20 Claims, 3 Drawing Sheets

(51) Int. Cl.
  *G06F 40/20*    (2020.01)
  *G06N 20/00*    (2019.01)
  *G06V 10/30*    (2022.01)
  *G06V 30/413*   (2022.01)
  *G06V 30/416*   (2022.01)

(52) U.S. Cl.
  CPC ............ *G06V 10/30* (2022.01); *G06V 30/413* (2022.01); *G06V 30/416* (2022.01)

(56) References Cited

U.S. PATENT DOCUMENTS

| | | |
|---|---|---|
| 7,580,551 B1 * | 8/2009 | Srihari ................... G06V 40/33 382/187 |
| 7,644,052 B1 | 1/2010 | Chang et al. |
| 7,813,822 B1 | 10/2010 | Hoffberg |
| 7,945,101 B2 | 5/2011 | Chen et al. |
| 8,165,974 B2 | 4/2012 | Privault et al. |
| 8,239,335 B2 | 8/2012 | Schmidtler et al. |
| 8,374,977 B2 | 2/2013 | Schmidtler et al. |
| 8,442,319 B2 | 5/2013 | Sarkar et al. |
| 8,503,797 B2 | 8/2013 | Turkelson et al. |
| 8,520,941 B2 | 8/2013 | Nafarieh et al. |
| 8,719,197 B2 | 5/2014 | Schmidtler et al. |
| 8,897,563 B1 | 11/2014 | Welling et al. |
| 8,996,350 B1 | 3/2015 | Dub et al. |
| 9,406,030 B2 | 8/2016 | Dolev et al. |
| 9,836,455 B2 | 12/2017 | Martens et al. |
| 9,923,931 B1 | 3/2018 | Wagster et al. |
| 10,467,464 B2 | 11/2019 | Chen et al. |
| 10,482,118 B2 | 11/2019 | Zheng |
| 10,503,971 B1 | 12/2019 | Dang et al. |
| 10,565,502 B2 | 2/2020 | Scholtes |
| 10,599,885 B2 | 3/2020 | Galitsky |
| 10,657,158 B2 | 5/2020 | Sheng et al. |
| 10,936,970 B2 | 3/2021 | Guggilla et al. |
| 10,963,503 B2 | 3/2021 | Skiles et al. |
| 11,798,258 B2 * | 10/2023 | Nguyen ................. G06V 10/30 |
| 2008/0086432 A1 | 4/2008 | Schmidtler et al. |
| 2009/0116736 A1 | 5/2009 | Neogi et al. |
| 2011/0249905 A1 | 10/2011 | Singh et al. |
| 2011/0258150 A1 | 10/2011 | Neogi et al. |
| 2017/0270115 A1 | 9/2017 | Cormack et al. |
| 2018/0197105 A1 | 7/2018 | Luo et al. |
| 2018/0365593 A1 | 12/2018 | Galitsky |
| 2019/0147103 A1 | 5/2019 | Bhowan et al. |
| 2020/0019769 A1 | 1/2020 | Leibovitz et al. |
| 2020/0218719 A1 | 7/2020 | Eifert et al. |
| 2021/0026874 A1 | 1/2021 | Ikeda |
| 2021/0201112 A1 * | 7/2021 | Gauthier Melançon ..................... G06V 10/40 |

\* cited by examiner

AUTOMATED CATEGORIZATION AND ASSEMBLY OF LOW-QUALITY IMAGES INTO ELECTRONIC DOCUMENTS

CROSS-REFERENCE TO RELATED APPLICATIONS

This application is a continuation of U.S. patent application Ser. No. 17/306,495 filed May 3, 2021, and entitled "AUTOMATED CATEGORIZATION AND ASSEMBLY OF LOW-QUALITY IMAGES INTO ELECTRONIC DOCUMENTS," which is incorporated herein by reference.

TECHNICAL FIELD

The present disclosure relates generally to image analysis, and more particularly, to automated categorization and assembly of low-quality images into electronic documents.

BACKGROUND

Organizations are increasingly moving in a "paperless" direction. For example, organizations often request that their members submit documents electronically (by email, uploading to a website, etc.), rather than sending physical copies of the documents in the mail. Once received, each document is typically identified and stored in an appropriate electronic location. While organizations often rely on individuals to perform this categorization and storage process, manually reviewing each document may be impractical especially when large volumes of electronic documents are received.

SUMMARY

According to an embodiment, an apparatus includes a memory and a hardware processor communicatively coupled to the memory. The memory stores an optical character recognition (OCR) algorithm, and a natural language processing (NLP) algorithm. The processor receives an image of a page of a physical document. The processor also converts, by executing the OCR algorithm, the image into a set of text. The processor additionally identifies one or more errors in the set of text, the one or more errors associated with noise in the image, wherein each error of the one or more errors is assigned to an error type of a plurality of error types. The processor also generates a feature vector from the set of text. The feature vector includes a first plurality of features obtained by executing the NLP algorithm on the set of text, and a second plurality of features. Each feature of the second plurality of features is associated with an error type of the plurality of error types and provides a measure of a quantity of errors of the one or more errors that are assigned to the associated error type. The processor additionally assigns, based on the feature vector, the image to a first document category of a set of document categories. Documents assigned to the first document category share one or more characteristics, and the feature vector is associated with a probability that the physical document associated with the image includes the one or more characteristics, where the probability is greater than a threshold. In response to assigning the image to the first document category, the processor stores the image in a database as a page of an electronic document belonging to the first document category.

According to another embodiment, an apparatus includes a memory and a hardware processor communicatively coupled to the memory. The memory stores a set of document categories, a first set of text, and a machine learning algorithm. The first set of text was generated from a first image of a page of a physical document. The page includes a second set of text. The first set of text is different from the second set of text by at least a set of errors. The set of errors is associated with noise in the first image. The machine learning algorithm, when applied to the first set of text and executed by the processor, is configured to extract a set of features from the first set of text. The set of features includes a first plurality of features obtained by performing natural language processing feature extraction operations on the first set of text, and a second plurality of features. Each feature of the second plurality of features is assigned to an error type of a set of error types and is associated with one or more errors of the set of errors. The one or more errors belong to the error type of the set of error types assigned to the feature. The machine learning algorithm is also configured, when executed by the processor, to generate a first feature vector that includes the first plurality of features and the second plurality of features. The machine learning algorithm is additionally configured, when executed by the processor, to generate, based on the first feature vector, a first set of probabilities. Each probability of the first set of probabilities is associated with a document category of the set of document categories and indicates a probability that the physical document from which the first set of text was generated belongs to the associated document category. The hardware processor applies the machine learning algorithm to the first set of text, to generate the first set of probabilities. The processor also identifies a largest probability of the first set of probabilities. The processor further assigns the first image to the document category associated with the largest probability of the first set of probabilities.

Certain embodiments may provide one or more technical advantages. As an example, an embodiment conserves processing and networking resources by automatically categorizing and indexing received electronic documents, without the need to rely on human indexers to manually review each document. As another example, an embodiment provides an improved machine learning classification algorithm that is adapted to accurately categorize low-quality images. In particular, the algorithm takes into account the presence of errors in computer-readable text generated by conventional optical character recognition algorithms operating on such images, by including multiple error-related features in the machine learning feature vector used to perform the categorization. In this manner, certain embodiments provide improved accuracy as compared with conventional categorization tools.

The document categorization tool described in the present disclosure may particularly be integrated into a practical application of tool for use by an organization that receives large quantities of electronic documents that are to be indexed and stored within the organization for future access. Use of the tool by such an organization may enable the organization to process orders of magnitude more documents than would be possible by relying on manual categorization alone. The document categorization tool may also be integrated into a practical application of a tool for use by a library or other organization that is seeking to offer electronic copies of its physical documents online. Because the tool is adapted to categorize noisy/low-quality images, it is well adapted for use with scanned images of old books, which may include creases, stains, or other defects.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
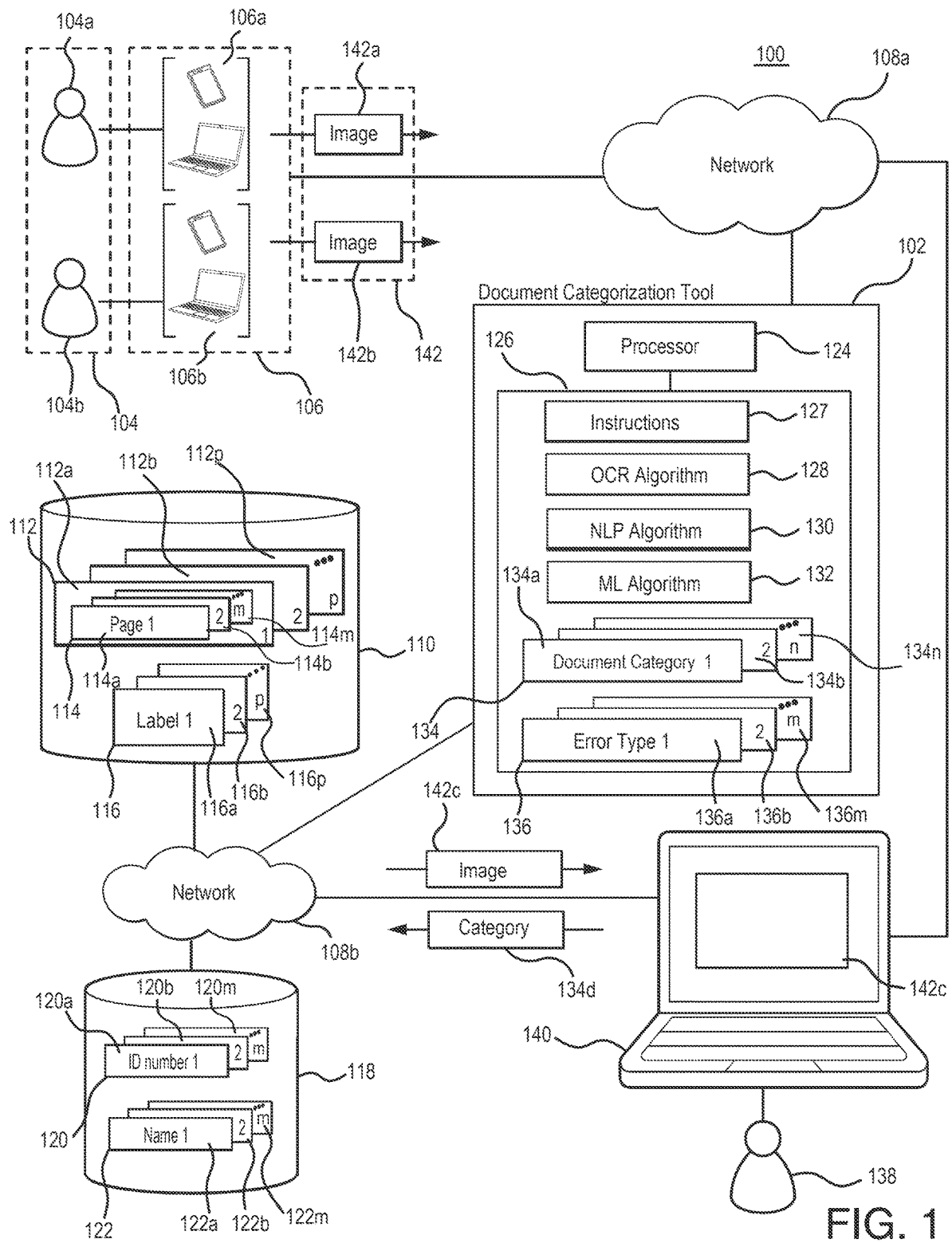
FIG. 1 illustrates an example document categorization system.
Figure 2:
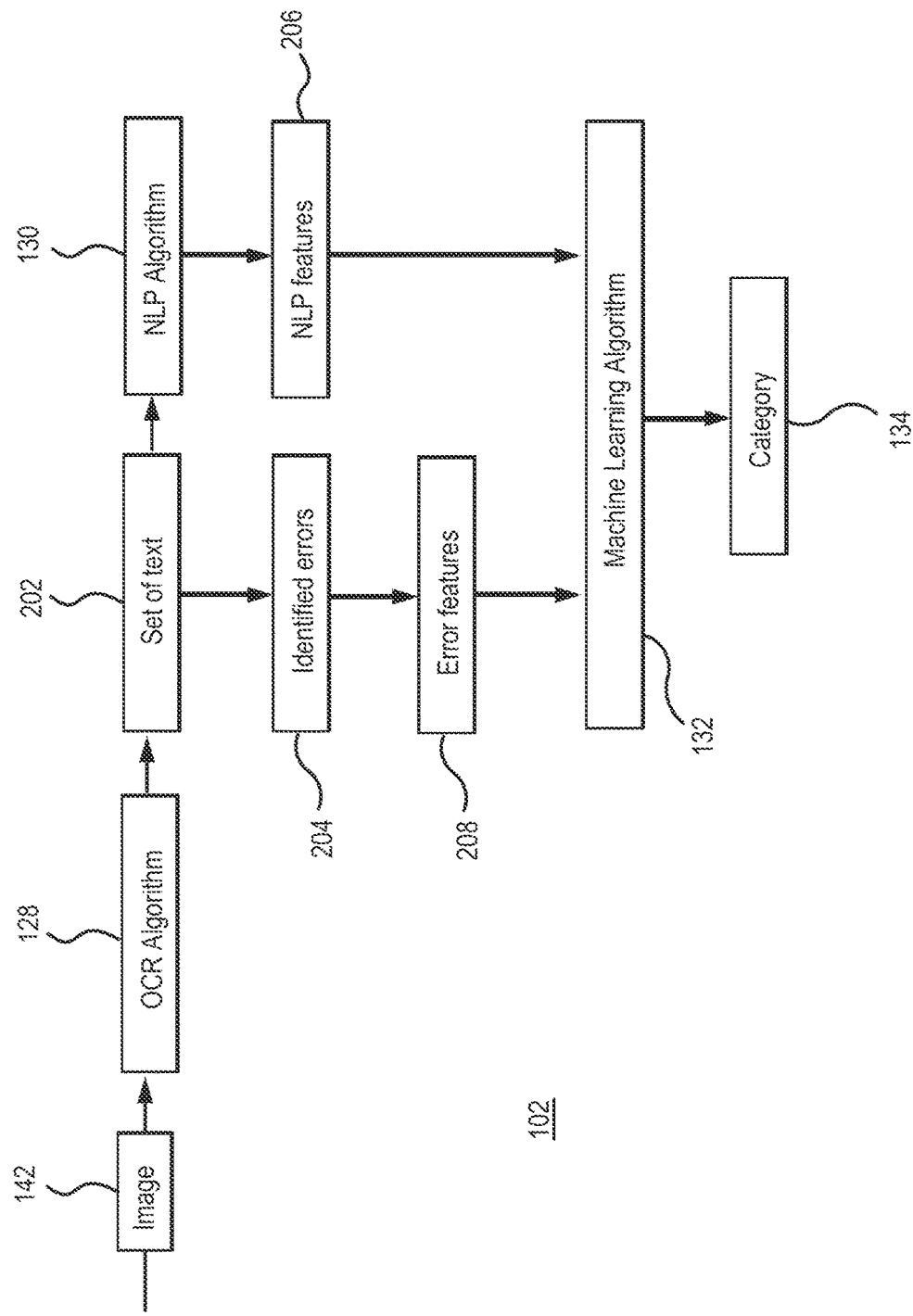
FIG. 2 illustrates an example of the manner by which the document categorization tool of the system presented in FIG. 1 assigns an image of a physical document to a document category.
Figure 3:
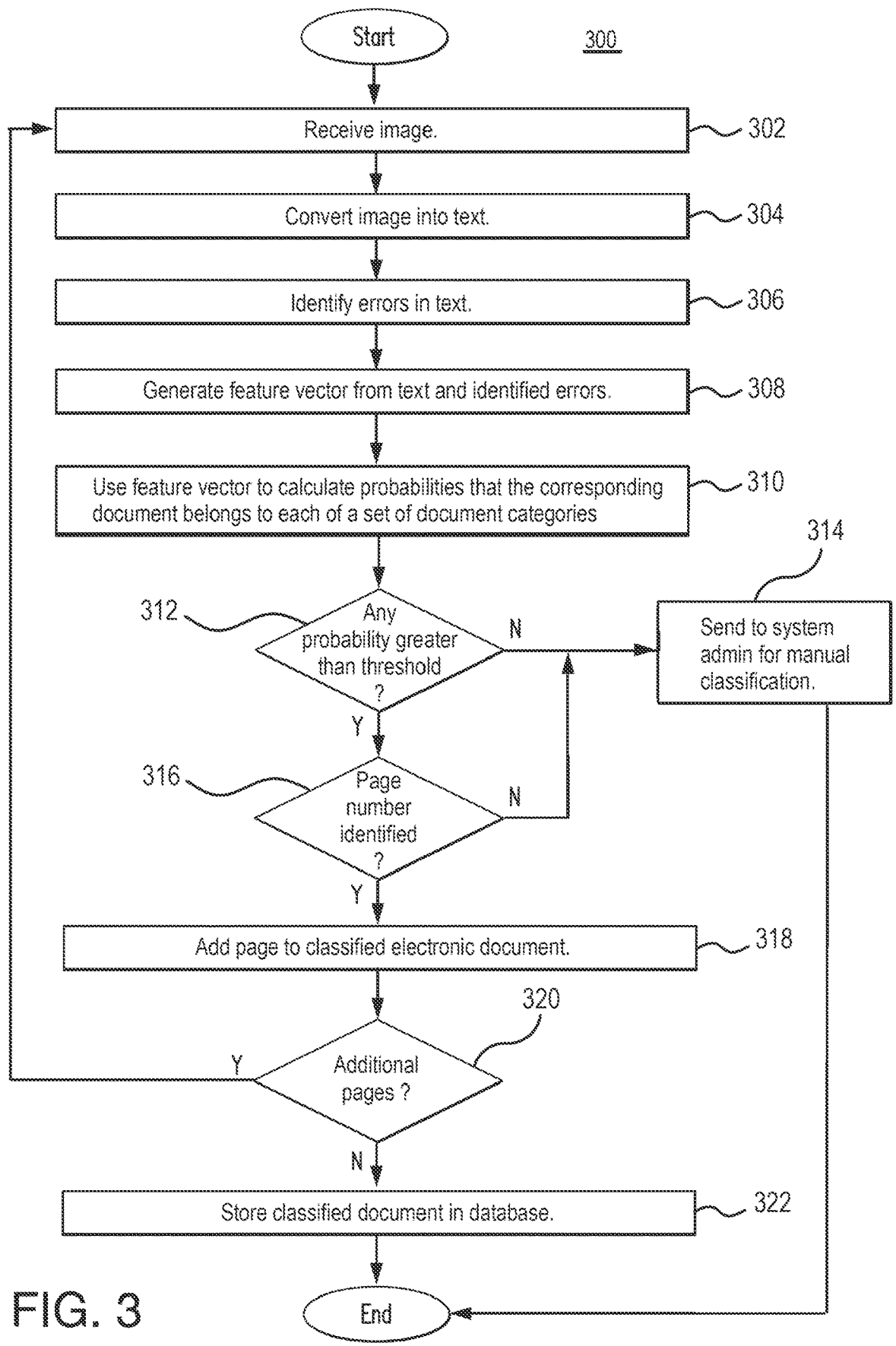
FIG. 3 presents a flowchart illustrating an example process by which the document categorization tool of the system presented in FIG. 1 receives electronic images of pages of physical documents, categorizes those images, assembles the categorized images into electronic documents, and stores the documents in a database for future use.

Embodiments of the present disclosure and its advantages may be understood by referring to FIGS. 1 through 3 of the drawings, like numerals being used for like and corresponding parts of the various drawings.

I. System Overview

FIG. 1 illustrates an example document categorization and storage system 100 that includes document categorization tool 102, user(s) 104, device(s) 106, external network 108a, internal network 108b, first database 110, second database 118, system administrator 138, and administrator device 140. Generally, document categorization tool 102 is configured to (1) receive images 142 of pages of physical documents, (2) assign each image to a document category 134, based on the content of the image, (3) assemble images 142 of pages of the same physical document into an electronic document 112 of a given document category 134, and (4) store the electronic document 112 in database 110. Details of the manner by which document categorization tool 102 performs these functions are presented below and in the discussion of FIGS. 2 and 3.

Devices 106 are used by users 104 located on external network 108b to communicate with document categorization tool 102. In particular, users 104 use devices 106 to transmit images 142 to document categorization tool 102. Each image 142 corresponds to an electronically generated image of a page of a physical document. For example, an image 142 may be of a page of a book, a letter, a notice, a receipt, a passport, or any other suitable physical document. Images 142 may include handwritten, typewritten, or printed text. Images 142 may be of pages that include only text, or a combination of text and graphics. For example, image 142a may be an image of a page of a children's book, and image 142b may be a page of a classic novel. As another example, in some embodiments, images 142 may be of pages that include text corresponding to identification information associated with users 104, or other individuals to whom the associated physical documents pertain. For example, an image 142a may include a name, an address, a phone number, a birthdate, a driver's license number, a passport number, an employee identification number, a customer identification number, and/or any other suitable identifying information. In certain embodiments, images 142 may be of pages that include page numbers.

Images 142 may be generated in any suitable manner. For example, in certain embodiments, images 142 may be generated by scanning the pages of a physical document, by taking digital photographs of a physical document, and/or in any other suitable manner. In certain embodiments, an image 142a may correspond to an electronic copy of a previously reproduced page of a physical document. For example, image 142a may be generated by scanning a photocopy, a fax, a photograph, and/or any other suitable reproduction of a page of a physical document.

Images 142 may be of varying levels of quality. For example, in certain embodiments, images 142 may include high quality images of pristine physical documents (e.g., documents without any creases, marks, etc.). In some embodiments, images 142 may include low quality images that include significant amounts of noise. This noise may correspond to defects in the physical document (e.g., creases, tears, stains, bleed-through of the content on the opposite side of the page, handwriting in the margin of the page, etc.), non-textual features of the physical document (e.g., hole punches, ruled lines, background color, etc.), and/or noise generated during the image capturing process (or any intermediate reproduction of the page of the physical document) and/or during transmission of the image. For example, the noise may correspond to uneven contrast in the image, salt-and-pepper noise, noise associated with document skew while scanning, show through effects, interfering strokes, and/or any other type of noise that may be generated in the image. In particular, as used throughout this disclosure, noise refers to any feature of an image 142 that may interfere with the ability of a conventional optical character recognition (OCR) algorithm to accurately extract text from the image.

Users 104 may use devices 106 to transmit images 142 to document categorization tool 102 in any suitable manner. For example, in certain embodiments, users 104 transmit images 142 using email. In some embodiments, document categorization tool 102 (or another component of system 100) may host a webpage through which users 104 may upload images 142. For example, the webpage may include a graphical user interface (GUI) that includes a button, selectable by a user 104, to begin the process of uploading one or more images 142 to document categorization tool 102. In response to selecting the button, the GUI may enable user 104 to navigate to one or more images 142 stored on device 106, and select those images for upload to document categorization tool 102. In certain embodiments, the GUI may also include one or more fields for input of information associated with images 142. For example, the GUI may include a field through which user 104 may input his/her name or other identifying information.

Devices 106 may transmit images 142 belonging to the same physical document in a single communication, or in a stream of communications. For example, device 106a may transmit a first image 142a corresponding to a first page of a physical document in a first transmission, and a second image 142b corresponding to the second page of the physical document in a second transmission. Alternatively, device 106a may transmit both first image 142a and second image 142b in the same transmission.

Devices 106 include any appropriate device from transmitting images 142 to document categorization tool 102. In some embodiments, devices 106 include devices for capturing images 142 in addition to transmitting the images to document categorization tool 102. As an example, device 106 may be a scanner equipped with email functionality, such that user 104 may use the scanner to scan a page of a physical document and then email the resulting image 142 to document categorization tool 102. As another example, device 106 may be a mobile phone equipped with a camera, which user 104 may use to capture an image 142 of a page of a physical document. In some embodiments, devices 106 include devices for receiving images 142 captured by other image capturing equipment and then transmitting the received images 142 to document categorization tool 102. For example, device 106 may be a computer or other device that is connected to a scanner. In general, devices 106 include any appropriate device for communicating with components of system 100 over external network 108a. For example, device 106 may be a telephone, a mobile phone, a computer, a laptop, a wireless or cellular telephone, a tablet, a server, an IoT device, and/or an automated assistant, among others. This disclosure contemplates devices 106 being any appropriate device for sending and receiving communications over network 108a. Device 106 may also include a user interface, such as a display, a microphone, keypad, or other appropriate terminal equipment usable by user 104. In some embodiments, an application executed by a processor of device 106 may perform the functions described herein.

External network 108a facilitates communication between devices 106 and document categorization tool 102. This disclosure contemplates external network 108a being any suitable network operable to facilitate communication between such components. In certain embodiments, external network 108a is accessible to members of the general public. Accordingly, in certain embodiments, document categorization tool 102 is connected to external network 108a through a firewall or other network security device. External network 108a may include any interconnecting system capable of transmitting audio, video, signals, data, messages, or any combination of the preceding. Network 108a may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Internal network 108b facilitates communication between document categorization tool 102, first database 110, second database 118, and administrative device 140. This disclosure contemplates external network 108a being any suitable network operable to facilitate communication between such components. In certain embodiments, internal network 108b may belong to the organization to which document categorization tool 102 belongs and may be accessible only through a device registered with the organization. Internal network 108b may include any interconnecting system capable of transmitting audio, video, signals, data, messages, or any combination of the preceding. Network 108b may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

While FIG. 1 illustrates devices 106 connected to document categorization tool 102 over external network 108a, in certain embodiments document categorization tool 102 may receive images 142 over internal network 108b. For example, users 104 may be employees of the organization to which document categorization tool 102 belongs, and may use devices 106 connected to the organization's internal network 108b to transmit images 142 to document categorization tool 102. Accordingly, in certain embodiments, internal network 108b and external network 108a may correspond to the same network.

First database 110 corresponds to any storage system that is configured to store a set of electronic documents 112, each of which includes one or more pages 114. Each electronic document 112 is an electronic version of a corresponding physical document. In certain embodiments, page(s) 114 of electronic document 112 correspond to the images 142 of the pages of the corresponding physical document that were received by document categorization tool 102. In some embodiments, page(s) 114 may correspond to text that was extracted from the images 142 of the pages of the corresponding physical document.

In certain embodiments, first database 110 may also store a set of labels 116. Each label 116a through 116p corresponds to a document 112a through 112p, and includes information associated with the document. As an example, a label 116 may indicate a document type (e.g., the document category 134 into which the corresponding electronic document 112 has been categorized). A label 116 may also provide information about the user(s) 104 who submitted the image(s) 142 from which electronic document 112 was formed, and/or the individual to whom the electronic document 112 pertains. For example, label 116a may indicate that a first user 104a submitted electronic document 112a (e.g., by transmitting a set of images 142a to document categorization tool 102, that were subsequently stored as pages 114a through 114m of electronic document 112a).

In certain embodiments, system 100 also includes second database 118. Second database 118 corresponds to any storage system that is configured to store identification information, such as identification numbers 120a through 120m, and/or names of individuals 122a through 122m. This identification information may be associated with users 104, and/or other individuals to whom electronic documents 112 pertain. For example, second database 118 may store names 122 and identification numbers 120 of individuals who hold accounts with the organization to which document categorization tool 102 belongs. In certain embodiments, document categorization tool 102 may use the identification information stored in second database 118 for document verification purposes. As an example, in certain embodiments, user 104a may transmit image 142a to document categorization tool 102 by uploading image 142a to a webpage operated by document categorization tool 102. As part of the uploading process, user 104a may also submit identification number 120a to document categorization tool 102, to indicate that the uploaded images 142a are associated with an account that corresponds to identification number 120a and that is held with the organization to which document categorization tool 102 belongs. In response to receiving images 142a and identification number 120a, document categorization tool 102 may verify that the received images 142a do indeed correspond to pages of documents that pertain to the account corresponding to identification number 120a, before storing these images as part of one or more electronic documents 112 in first database 110. For example, document categorization tool 102 may use the received identification number 120a to locate a name 122a (e.g., the name of the account holder) that is linked to identification number 120a in second database 118. Document categorization tool 102 may then verify that the received images 142a pertain to the account corresponding to identification number 120a, by determining that one or more of the received images 142a includes text corresponding to name 122a.

In certain such embodiments, the submission of identification number 120a by user 104a may occur automatically. For example, in embodiments in which user 104 uploads images 142 using a webpage GUI, in order to access the webpage, user 104a may first need to provide identifying information associated with his/her account (e.g., a username and password associated with the account) and/or information associated with the account of another individual to whom images 142a pertain (e.g., a customer identification number, etc.). The GUI may then use this information to obtain identification number 120a, which it attaches as, for example, metadata to images 142a that are subsequently uploaded by user 104a.

As illustrated in FIG. 1, document categorization tool 102 includes processor 124 and memory 126. This disclosure contemplates processor 124 and memory 126 being configured to perform any of the functions of document categorization tool 102 described herein. For example, processor 124 may execute instructions stored in memory 126 to perform any of the functions described herein. In general, document categorization tool 102 is configured to: (1) receive images 142 transmitted by users 104; (2) apply optical character recognition (OCR) algorithm 128 to each image 142 to convert the image into a set of text; (3) assign each image into a document category 134, by applying machine learning algorithm 132 to the corresponding set of text; (4) extract a page number from each set of text (if present); (5) use the assigned document categories and page numbers to assemble the received images 142 into electronic documents 112; and (6) store electronic documents 112 in database 110. The manner in which document categorization tool 102 performs these functions is described in further detail below, in the discussion of FIGS. 3 and 4.

Processor 124 is any electronic circuitry, including, but not limited to central processing unit(s) (CPUs), graphics processing unit(s) (GPUs), microprocessors, application specific integrated circuits (ASIC), application specific instruction set processor (ASIP), and/or state machines, that communicatively couples to memory 126 and controls the operation of document categorization tool 102. Processor 124 may be 8-bit, 16-bit, 32-bit, 64-bit or of any other suitable architecture. Processor 124 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 124 may include other hardware and software that operates to control and process information. Processor 124 executes software stored on memory to perform any of the functions described herein. Processor 124 controls the operation and administration of document categorization tool 102 by processing information received from device(s) 106, external network 108a, internal network 108b, first database 110, second database 118, administrator device 140, and/or memory 126. Processor 124 may be a programmable logic device, a microcontroller, a microprocessor, any suitable processing device, or any suitable combination of the preceding. Processor 124 is not limited to a single processing device and may encompass multiple processing devices. For example, in certain embodiments, a first processor 124 may be configured to apply OCR algorithm 128 to received images 142, to convert the images into sets of text, and a second processor 124 may be configured to apply machine learning algorithm 132 to each set of text, to assign the corresponding image 142 to a document category 134.

Memory 126 may store, either permanently or temporarily, data, operational software, or other information for processor 124. Memory 126 may include any one or a combination of volatile or non-volatile local or remote devices suitable for storing information. For example, memory 126 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 126, a disk, a CD, or a flash drive. In particular embodiments, the software may include an application executable by processor 124 to perform one or more of the functions described herein.

In certain embodiments, memory 126 also stores OCR algorithm 128, NLP algorithm 130, machine learning algorithms 132, document categories 134a through 134n, and error types 136a through 136m. OCR algorithm 128 is any algorithm configured to convert an image that includes handwritten, typewritten, or printed words into a set of machine-encoded text. As an example, OCR algorithm 128 may be an algorithm configured to compare each character depicted in an image to a set of characters stored in library, to find the best match. As another example, OCR algorithm 128 may be a machine learning algorithm that has been trained to identify characters depicted in images. As is typical with conventional OCR algorithms, this disclosure contemplates that OCR algorithm 128 generally performs well (e.g., accurately reproduces the text depicted in the image) when converting high quality images of pristine physical documents (e.g., documents without any creases, marks, etc.) into machine-readable text. However, OCR algorithm 128 performs less well (e.g., generates significant numbers of errors) when converting lower quality images into machine-readable text. Here, lower quality images refer to images 142 that include significant noise in the image. Such noise includes anything that interferes with the OCR algorithm's ability to accurately convert the text depicted in the image into machine-readable text. For example, the noise may correspond to defects in the physical document (e.g., creases, tears, stains, bleed-through of the content on the opposite side of the page, handwriting in the margin of the page, etc.), non-textual features of the physical document (e.g., hole punches, ruled lines, background color, etc.), and/or noise generated during the image capturing process (or any intermediate reproduction of the page of the physical document) and/or during transmission of the image. For example, the noise may correspond to uneven contrast in the image, salt-and-pepper noise, noise associated with document skew while scanning, show through effects, interfering strokes, and/or any other type of noise that may be generated in the image.

When operating on lower quality images 142, OCR algorithm 128 may generate machine-readable text that includes a significant quantity of errors, when compared with the textual content depicted in the images. These errors include any disagreements between the machine-readable text and the text depicted in the images. Such errors may include, for example, the presence of non-ascii characters, the presence of non-English words, stray letters in the machine-readable text, other than "a" or "I," the presence of letter(s) within a number, misplaced punctuation marks, erroneous dates (e.g., Jul. 42, 2020), and/or any other type of of 23 errors that may be generated during the OCR conversion process. Document categorization tool 102 includes instructions 127 for detecting such errors and for classifying them into one or more categories of error types 136a through 136m. For example, a first error type 136a may correspond to errors associated with the presence of non-ascii characters in the machine-readable text, a second error type 136b may correspond to the presence of non-English words in the machine-readable text, a third error type 136c may correspond to the presence of stray letters other than "a" and "I" in the machine-readable text, etc.

Document categorization tool 102 uses NLP algorithm 130 and machine learning algorithm 132 to categorize received images 142 into document categories 134, based on the content of the text extracted from the images by OCR algorithm 128. NLP algorithm 130 includes one or more algorithms that are used by document classification tool 102 to extract conventional natural language processing features from a set of machine-readable text. For example, in certain embodiments, NLP algorithm 130 includes algorithms configured to extract features that could be used by a conventional document classification algorithm to classify machine-readable text into a document category of a set of document categories 134. NLP algorithm 130 may include one or more conventional NLP methods of feature extraction including, for example, bag of words, bag of N-grams, term frequency-inverse document frequency (TF-IDF), and/or any other suitable feature extraction method.

Document categories 134a through 134n correspond to any set of categories into which documents (received by document categorization tool 102 as one or more images 142) may be classified. The set of document categories 134 may include any number of two or more categories. As an example, the set of document categories 134 may correspond to categories that are used to classify books, and may include a first document category 134a that corresponds to "fiction," and a second document category that corresponds to "non-fiction." As another example, the set of document categories 134 may correspond to categories that are used to classify non-fiction books, and may include a first document category 134a that corresponds to "biographies," a second document category 134b that corresponds to "science," a third document category 134c that corresponds to "history," a fourth document category 134d that corresponds to "self-help," and so on. As a further example, document categories 134 may correspond to categories that are used by an organization to categorize documents associated with the purchase of a property, and may include a first document category 134a that corresponds to "identification documents," a second document category 134b that corresponds to "mortgage documents," a third document category 134c that corresponds to "title documents," and a fourth document category 134d that corresponds to "purchase agreement." In certain embodiments, set of document categories 134 may also include an "other" document category (e.g., document categories 134e) into which all documents that do not fit into any of the other categories are classified. For example, where document categories 134 are used by an organization to categorize documents associated with the purchase of a property, a fifth document category 134e that corresponds to "other" may be used to categorize documents that, for example, have nothing to do with the purchase of a property and may have been transmitted to document categorization tool 102 in error.

Machine learning algorithm 132 is any algorithm trained to classify a received image 142 into one of document categories 134a through 134n, using the NLP features generated by NLP algorithm 130, while also taking into consideration the quality of the image 142 from which the text used to generate the NLP features was extracted. This may be desirable to improve the accuracy of machine learning algorithm 132 in classifying images 142 into document categories 134, as compared with a conventional machine learning classification algorithm that does not take underlying image quality into consideration. In particular, while the features generated by NLP algorithm 130 may be sufficient for use by a conventional machine learning classification algorithm in classifying high quality images 142 of pristine physical documents into document categories 134a through 134n, such conventional algorithms are known to perform poorly when the underlying images 142 include significant amounts of noise.

To take image quality into account, machine learning algorithm 132 is configured to extract additional features from the machine-readable text that was extracted from a received image 142, where the additional features are associated with errors in the text. For example, machine learning algorithm 132 may be configured to identify errors in the text, assign each identified error to an error type 136, and generate a set of features from the identified and classified errors. As an example, these features may include a number of each type 136a through 136m of identified error in the text. The features may also include information associated with the location of each identified error in the text (e.g., line number and character offset). Machine learning algorithm 132 is configured to add the features associated with the errors identified in the OCR-generated text, to the features obtained by OCR algorithm 128, to generate a combined feature vector, which it then uses to assign the text (and accordingly the image 142 from which the text was generated) into one of document categories 134a through 134n. For example, machine learning algorithm 132 may determine, based on the combined feature vector, a set of probabilities, where each probability of the set corresponds to a document category of the set of documents categories 134a through 134n, and indicates the probability that the image 142 associated with the feature vector is of a page of a document that belongs to the associated document category. As a specific example, where document categories 134 includes a first category 134a corresponding to "fiction," and a second category 134b corresponding to "non-fiction," machine learning algorithm 132 may determine, based on the combined feature vector, that there is a 5% probability that a received image 142a is of a page of a physical document that belongs to "fiction" category 134a, and a 95% probability that the image is of a page of a physical document that belongs to "non-fiction" category 134b.

Machine learning algorithm 132 may be any machine learning algorithm suitable for categorizing information. For example, machine learning algorithm 132 may be a neural network algorithm, a decision tree algorithm, a naïve Bayes algorithm, a logistic regression algorithm, a support vector machine algorithm, a random forest algorithm, and/or any other suitable machine learning classification algorithm.

In certain embodiments, instructions 127 also include instructions for use by document classification tool 102 in training machine learning algorithm 132. For example, instructions 127 may include instructions for training machine learning algorithm 132 based on training data stored in first database 110. Such training data may include images 114 that are stored in database 110 as pages of electronic documents 112, along with the document categories 134 into which images 114 have previously been assigned. These assigned categories may be stored in database 110 as labels 116. For example, each label 116a through 116p may correspond to an electronic document 112a through 112p, and may indicate a document category of document categories 134a through 134n that has previously been assigned to the electronic document 112 (and accordingly, to all of the images 114a through 114m of the electronic document 112). Instructions 127 may include any suitable instructions for using such training data to train machine learning algorithm 132. As an example, where machine learning algorithm 132 is a neural network algorithm, the process of training the algorithm may involve adjusting the weights assigned to the neurons in the neural network, such that, when applied to an image 114 of a known document category 134 (specified through label 116), the neural network algorithm assigns the image to the correct document category.

In certain embodiments, system 100 also includes administrator device 140. Administrator device 140 includes any device that may be operated by a system administrator 138 to communicate with components of system 100. As an example, in certain embodiments, system administrator 138 may use administrator device 140 to receive images 142c, and to view those images on the display of the device. For example, in certain embodiments, machine learning algorithm 132 may not be able to assign a document category 134 to image 142c. For instance, in attempting to categorize image 142c, document categorization tool 102 may use machine learning algorithm 132 to generate a set of probabilities, where each probability corresponds to a document category of the set of document categories 134, and indicates a probability that image 142c is of a page of a physical document that belongs to the corresponding document category. However, document categorization tool 102 may determine that none of the probabilities are greater than a threshold value. Accordingly, document categorization tool 102 may determine that machine learning algorithm 132 was unable to categorize image 142c. In such situations, document categorization tool 102 may transmit image 142c to administrator device 140 for manual categorization by administrator 138. System administrator 138 may then view image 142c on the display of device 140, assign the image to one of document categories 134a through 134n (e.g., category 134d), and transmit this assigned category back to document categorization tool 102.

Administrator device 140 includes any appropriate device for receiving images 142c, displaying received images 142c, for view by system administrator 138, and transmitting categories 134d assigned by administrator 138 to the received images 142c to document categorization tool 102. For example, administrator device 140 may be a mobile phone, a computer, a laptop, a tablet, a server, an IoT device, and/or an automated assistant, among others. This disclosure contemplates device 140 being any appropriate device for sending and receiving communications over networks 108a and/or 108b and displaying images 142c for view by administrator 138. In addition to a display, device 140 may include any other suitable user interface, such as a microphone, keypad, or other appropriate terminal equipment usable by user 104. In some embodiments, an application executed by a processor of device 140 may perform the functions described herein.

Modifications, additions, or omissions may be made to the systems described herein without departing from the scope of the invention. For example, system 100 may include any number of users 104, devices 106, networks 108a/b, first databases 110, second databases 118, administrators 138, and/or administrator devices 140. The components may be integrated or separated. Moreover, the operations may be performed by more, fewer, or other components. Additionally, the operations may be performed using any suitable logic comprising software, hardware, and/or other logic.

II. Image Categorization

FIG. 2 presents an example illustrating the manner by which document categorization tool 102 assigns an image 142 of a page of a physical document to a document category 134. Document categorization tool 102 is configured to receive one or more images 142, each of which corresponds to an electronic image (e.g., a scan, a photograph, etc.) of a page of a physical document. In certain embodiments, document categorization tool 102 is configured to receive these images 142 over time, as a stream of images 142. For example, document categorization tool 102 may receive each image 142 in a separate transmission from a scanner. In some embodiments, document categorization tool 102 is configured to receive multiple images 142 at once. For example, document categorization tool 102 may receive multiple images 142 that were included in an email attachment transmitted by user 104. In certain embodiments, the images received by document categorization tool 102 may be out of order, as compared to the corresponding pages of the physical document, from which the images were obtained. Similarly, document categorization tool 102 may receive a set of images 142 that includes images captured from multiple different documents. Accordingly, document categorization tool 102 is configured to process and categorize each received image 142 separately, and then assemble the categorized images into electronic documents 112. The manner by which document categorization tool 102 assembles categorized images into electronic documents 112 is described in further detail below, in the discussion of FIG. 3.

As illustrated in FIG. 2, document categorization tool 102 first receives an image 142 of a page of a physical document. Document categorization tool 102 next applies OCR algorithm 128 to image 142, to convert the text depicted in the image into a set of machine-readable text 202. Document categorization tool 102 then identifies a set of features in set of text 202. In particular, document categorization tool 102 applies NLP algorithm 130 to identify a set of NLP features 206 in the text. Document categorization tool 102 also identifies a set of errors 204 in the text and assigns each identified error 204 to an error type 136 of a set of error types. Document categorization tool 102 then generates a set of features 208 associated with the identified and classified errors 204. Next, document classification tool 102 applies machine learning algorithm 132 to a combined feature vector formed from NLP features 206 and error features 208, to identify the most probable category 134 into which to categorize image 142. As an example, document classification tool 102 may apply machine learning algorithm 132 to the combined feature vector that includes NLP features 206 and error features 208, to generate a set of probabilities, where each probability of the set of probabilities corresponds to a document category of the set of document categories 134, and indicates the probability that the physical document from which image 142 was obtained belongs to the corresponding document category. Document classification tool 102 then identifies the largest probability of the set of probabilities, and assigns image 142 to the corresponding document category 134.

III. Method for Automatically Categorizing and Storing Electronic Documents

FIG. 3 presents a flowchart (described in conjunction with elements of FIGS. 1 and 2) illustrating an example method 300 by which document categorization tool 102 receives electronic images 142 of pages of physical documents, categorizes the images, assembles the categorized images into electronic documents 112, and stores the documents in database 110.

In step 302 document categorization tool 102 receives an image 142. In step 304 document categorization tool 102 applies OCR algorithm 128 to the received image to extract a set of machine-readable text 202 from the image. In step 306 document categorization tool 102 identifies one or more errors 204 in the set of text 202, and assigns each identified error 204 to an error type 136. In step 308 document categorization tool 102 generates a feature vector from the identified and classified errors 204 and the set of text 202. In particular, document categorization tool 102 generates a first set of features from the identified and classified errors 204, and a second set of features by applying a conventional NLP algorithm 130 to the set of text 202. In step 310 document categorization tool 102 applies machine learning algorithm 132 to the combined feature vector, to generate a set of probabilities, each of which is associated with a document category of the set of document categories 134, and corresponds to the probability that image 142 was obtained from a physical document that belongs to the associated document category. In step 312 document categorization tool 312 determines whether any of the probabilities generated by machine learning algorithm 132 are greater than a minimum threshold. If, in step 312 document categorization tool 312 determines that none of the probabilities generated by machine learning algorithm 132 are greater than the minimum threshold, in step 314 document categorization tool 102 sends image 142 to administrator device 140 for manual categorization by system administrator 138.

On the other hand, if, in step 312 document categorization tool 102 determines that one of the probabilities generated by machine learning algorithm 132 is greater than the minimum threshold, document categorization tool 102 next assigns image to the document category 134 associated with the largest generated probability. Then, in step 316 document categorization tool 102 determines whether it is able to identify a page number in the set of text 202, or is otherwise able to determine a location to position image 142 within an electronic document 112. For example, document categorization tool 102 may determine in step 316 that image 142 corresponds to a page of a single-page document, in which case no page number identification is needed. As another example, document categorization tool 102 may determine in step 316 that image 142 corresponds to a page of an N-page document, and that the tool has already processed and extracted page numbers from N−1 other images corresponding to the other pages of the document. Accordingly, even if document categorization tool 102 is unable to extract a page number from image 142, it will nevertheless be able to identify the correct position of image 142 within electronic document 112, by process of elimination.

Document categorization tool 102 may be configured to identify a page number in set of text 202 in any suitable manner. For example, document categorization tool 102 may be configured to search for a number at one or more locations within the text (e.g., at the top of the page, at the bottom of the page, etc.). Document categorization tool 102 may also be configured to identify a pattern within set of text 202 that is typically associated with page numbers, and to extract the page number from that pattern. For example, document categorization tool 102 may be configured to identify patterns such as "x/N," "page x," "x of N," "p. x," or any other suitable pattern, where "x" corresponds to the page number, and "N" corresponds to the total number of pages in the document.

If, in step 316 document categorization tool 102 determines that it is unable to identify a page number from set of text 202 or is otherwise unable to determine the proper position of image 142 within electronic document 112, method 300 proceeds to step 314, where image 142 is transmitted to administrator device 140 for manual positioning within electronic document 112. On the other hand, if, in step 316 document categorization tool 102 is able to identify a page number in set of text 202, in step 318 document categorization tool 102 adds image 142 to an electronic document 112 at a position within the electronic document specified by the page number. To do this, document categorization tool 102 relies on the document category 134 into which machine learning algorithm 132 categorized image 142. For example, if document categorization tool 102 receives a stream of images 142 that includes images 142 associated with multiple different physical documents, document categorization tool 102 is able to separate the images into different electronic documents 112, based on the document category 134 identified for each image. In step 320 document categorization tool 102 determines whether electronic document 112 is missing any pages, or whether electronic document 112 may include any additional pages (e.g., whether document categorization tool 102 is continuing to receive images 142 from the same source (e.g., device 106a)). If, in step 320 document categorization tool 102 determines that document 112 does not include any additional pages, in step 322 document categorization tool 102 stores electronic document 112 in database 110. Otherwise, method 300 returns to step 302.

Method 300 may include one or more additional steps. For example, in certain embodiments, method 300 includes a document verification step. In particular, when document categorization tool 102 receives an image 142, it may also receive an identification number 120 assigned to the image. Identification number 120 may be associated with an individual (e.g., an individual who holds an account with the organization to which document categorization tool 102 belongs), and may be included, for example, in the metadata of image 142. The inclusion of identification number 120 may indicate that image 142 was obtained from a document pertaining to the individual associated with identification number 120, and, accordingly, should be stored in database 110 as associated with that individual (e.g., through label 116). Document categorization tool 102 may use identification number 120 to verify that image 142 does indeed pertain to such individual, prior to storing image 142 in database 110. For example, document categorization tool 102 may use identification number 120 to obtain the name 122 of the individual to whom identification number 120 is assigned from second database 118. Document categorization tool 102 may then determine whether set of text 202 includes name 122 (or a set of characters similar to name 122, within a set tolerance). Document categorization tool 102 may determine whether set of text 202 includes name 122 in any suitable manner. For example, in certain embodiments, document categorization tool 102 determines whether set of text 202 includes name 122 based on cosine similarity and/or Levenshtein edit distance measures.

Modifications, additions, or omissions may be made to method 300 depicted in FIG. 3. Method 300 may include more, fewer, or other steps. For example, steps may be performed in parallel or in any suitable order. While discussed as document categorization tool 102 (or components thereof) performing the steps, any suitable component of system 100, such as user device(s) 106 and/or administrator device(s) 140 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
    a memory configured to store:
        a set of document categories;
        a first set of text generated from a first image of a page of a physical document, the page comprising a second set of text; and
        a machine learning algorithm configured, when applied to the first set of text and executed by a hardware processor, to:
            extract a set of features from the first set of text, the set of features comprising:
                a first plurality of features obtained by performing natural language processing feature extraction operations on the first set of text; and
                a second plurality of features, each feature of the second plurality of features assigned to an error type of a set of error types and associated with one or more errors of a set of errors, the one or more errors belonging to the assigned error type of the set of error types;
            generate a first feature vector comprising the first plurality of features and the second plurality of features; and
            generate, based on the first feature vector, a first set of probabilities, each probability of the first set of probabilities associated with a document category of the set of document categories and indicating a probability that the physical document from which the first set of text was generated belongs to the associated document category; and
    the hardware processor communicatively coupled to the memory, the hardware processor configured to:
        apply the machine learning algorithm to the first set of text, to generate the first set of probabilities;
        identify a largest probability of the first set of probabilities; and
        assign the first image to the document category associated with the largest probability of the first set of probabilities.

2. The apparatus of claim 1, wherein at least one error type of the set of error types is associated with at least one of:
    non-ascii characters;
    non-English words;
    stray letters other than "a" and "I";
    numbers comprising one or more letters; or
    misplaced punctuation marks.

3. The apparatus of claim 1, wherein:
    the image comprises at least one of:
        a scanned image generated by scanning the page of the physical document; or
        a faxed image generated by faxing the page of the physical document; and
    the noise in the image is associated with at least one of:
        ruled lines on the page of the physical document;
        hole punches on the page of the physical document;
        uneven contrast in the image;
        one or more folds in the page of the physical document;
        handwritten text in a margin of the page of the physical document;
        a background color of the image; or
        interfering strokes in the image, wherein the physical document comprises double-sided pages.

4. The apparatus of claim 1, wherein the machine learning algorithm comprises at least one of a neural network algorithm, a decision tree algorithm, a naive Bayes algorithm, and a logistic regression algorithm.

5. The apparatus of claim 1, wherein:
    the memory is further configured to store a third set of text generated from a second image of the page of the physical document;
    the machine learning algorithm is further configured, when applied to the third set of text and executed by the hardware processor, to:
        extract a second set of features from the third set of text, the second set of features comprising:
            a first plurality of features obtained by performing the natural language processing feature extraction operations on the third set of text; and
            a second plurality of features, each feature of the second plurality of features assigned to an error type of the set of error types and associated with one or more errors of a second set of errors in the third set of text, the one or more errors belonging to the assigned error type of the set of error types;
        generate a second feature vector comprising the first plurality of features of the second set of features and the second plurality of features of the second set of features, wherein the second feature vector is different from the first feature vector; and
        generate, based on the second feature vector, a second set of probabilities, each probability of the second set of probabilities associated with a document category of the set of document categories and indicating a probability that the physical document from which the third set of text was generated belongs to the associated document category; and
    the hardware processor is further configured to:
        apply the machine learning algorithm to the third set of text, to generate the second set of probabilities;
        identify a largest probability of the second set of probabilities; and
        assign the second image to the document category associated with the largest probability of the second set of probabilities, wherein the document category assigned to the second image is the same as the document category assigned to the first image.

6. The apparatus of claim 1, wherein:
    the memory is further configured to store training data comprising:
        a plurality of sets of text, each set of text of the plurality of sets of text generated from an image of a page of a known physical document of a set of known physical documents; and
        a plurality of labels, each label of the plurality of labels assigned to a set of text of the plurality of sets of text, and identifying a document category of the set of document categories into which the known physical document of the set of known physical documents has previously been categorized; and the hardware processor is further configured to use the training data to train the machine learning algorithm.

7. The apparatus of claim 6, wherein:
the machine learning algorithm comprises a set of adjustable weights; and
training the machine learning algorithm comprises adjusting the set of adjustable weights.

8. A method comprising:
applying a machine learning algorithm to a first set of text, to generate a first set of probabilities, wherein:
the first set of text was generated from a first image of a page of a physical document, wherein the physical document is assigned to a first document category of a set of document categories;
the machine learning algorithm is configured, when applied to the first set of text, to:
extract a set of features from the first set of text, the set of features comprising:
a first plurality of features obtained by performing natural language processing feature extraction operations on the first set of text; and
a second plurality of features, each feature of the second plurality of features assigned to an error type of a set of error types and associated with one or more errors of a set of errors, the one or more errors belonging to the assigned error type of the set of error types;
generate a first feature vector comprising the first plurality of features and the second plurality of features; and
generate, based on the first feature vector, the first set of probabilities; and
each probability of the first set of probabilities is associated with a document category of the set of document categories and indicates a probability that the physical document from which the first set of text was generated belongs to the associated document category;
identifying a largest probability of the first set of probabilities; and
assigning the first image to the document category associated with the largest probability of the first set of probabilities.

9. The method of claim 8, wherein at least one error type of the set of error types is associated with at least one of:
non-ascii characters;
non-English words;
stray letters other than "a" and "I";
numbers comprising one or more letters; or
misplaced punctuation marks.

10. The method of claim 8, wherein:
the image comprises at least one of:
a scanned image generated by scanning the page of the physical document; or
a faxed image generated by faxing the page of the physical document; and
the noise in the image is associated with at least one of:
ruled lines on the page of the physical document;
hole punches on the page of the physical document;
uneven contrast in the image;
one or more folds in the page of the physical document;
handwritten text in a margin of the page of the physical document;
a background color of the image; or
interfering strokes in the image, wherein the physical document comprises double-sided pages.

11. The method of claim 8, wherein the machine learning algorithm comprises at least one of a neural network algorithm, a decision tree algorithm, a naive Bayes algorithm, or a logistic regression algorithm.

12. The method of claim 8, further comprising:
applying the machine learning algorithm to a third set of text, to generate a second set of probabilities, wherein:
the third set of text was generated from a second image of the page of the physical document;
the machine learning algorithm is configured, when applied to the third set of text, to:
extract a second set of features from the third set of text, the second set of features comprising:
a first plurality of features obtained by performing the natural language processing feature extraction operations on the third set of text; and
a second plurality of features, each feature of the second plurality of features assigned to an error type of the set of error types and associated with one or more errors of a second set of errors, the one or more errors belonging to the assigned error type of the set of error types;
generate a second feature vector comprising the first plurality of features of the second set of features and the second plurality of features of the second set of features,
wherein the second feature vector is different from the first feature vector; and
generate, based on the second feature vector, the second set of probabilities; and
each probability of the second set of probabilities is associated with a document category of the set of document categories and indicates a probability that the physical document from which the third set of text was generated belongs to the associated document category;
identifying a largest probability of the second set of probabilities; and
assigning the second image to the document category associated with the largest probability of the second set of probabilities, wherein the document category assigned to the second image is the same as the document category assigned to the first image.

13. The method of claim 8, further comprising using training data to train the machine learning algorithm, wherein the training data comprises:
a plurality of sets of text, each set of text of the plurality of sets of text generated from an image of a page of a known physical document of a set of known physical documents; and
a plurality of labels, each label of the plurality of labels assigned to a set of text of the plurality of sets of text, and identifying a document category of the set of document categories into which the known physical document of the set of known physical documents has previously been categorized.

14. The method of claim 13, wherein:
the machine learning algorithm comprises a set of adjustable weights; and
training the machine learning algorithm comprises adjusting the set of adjustable weights.

15. A system comprising:
a memory configured to store:
a first image of a page of a physical document;
a first machine learning algorithm configured, when executed by a hardware processor, to convert a first image of a page of a physical document into a first set of text, wherein the page comprises a second set of text; and a second machine learning algorithm configured, when applied to the first set of text and executed by the hardware processor, to:

extract a set of features from the first set of text, the set of features comprising:

a first plurality of features obtained by performing natural language processing feature extraction operations on the first set of text; and a second plurality of features, each feature of the second plurality of features assigned to an error type of a set of error types and associated with one or more errors of a set of errors, the one or more errors of the set of errors belonging to the assigned error type of the set of error types;

generate a first feature vector comprising the first plurality of features and the second plurality of features; and generate, based on the first feature vector, a first set of probabilities, each probability of the first set of probabilities associated with a document category of the set of document categories and indicating a probability that the physical document from which the first set of text was generated belongs to the associated document category; and the hardware processor communicatively coupled to the memory, the hardware processor configured to:

apply the first machine learning algorithm to the first image, to generate the first set of text;

apply the second machine learning algorithm to the first set of text, to generate the first set of probabilities;

identify a largest probability of the first set of probabilities; and assign the first image to the document category associated with the largest probability of the first set of probabilities.

16. The system of claim 15, wherein at least one error type of the set of error types is associated with at least one of:
non-ascii characters;
non-English words;
stray letters other than "a" and "I";
numbers comprising one or more letters; or
misplaced punctuation marks.

17. The system of claim 15, wherein:
the image comprises at least one of:
a scanned image generated by scanning the page of the physical document; or
a faxed image generated by faxing the page of the physical document; and
the noise in the image is associated with at least one of:
ruled lines on the page of the physical document;
hole punches on the page of the physical document;
uneven contrast in the image;
one or more folds in the page of the physical document;
handwritten text in a margin of the page of the physical document;
a background color of the image; or
interfering strokes in the image, wherein the physical document comprises double-sided pages.

18. The system of claim 15, wherein the second machine learning algorithm comprises at least one of a neural network algorithm, a decision tree algorithm, a naive Bayes algorithm, and a logistic regression algorithm.

19. The system of claim 15, wherein:
the memory is further configured to store training data comprising:
a plurality of sets of text, each set of text of the plurality of sets of text generated from an image of a page of a known physical document of a set of known physical documents; and
a plurality of labels, each label of the plurality of labels assigned to a set of text of the plurality of sets of text, and identifying a document category of the set of document categories into which the known physical document of the set of known physical documents has previously been categorized; and
the hardware processor is further configured to use the training data to train the second machine learning algorithm.

20. The system of claim 19, wherein:
the second machine learning algorithm comprises a set of adjustable weights; and
training the second machine learning algorithm comprises adjusting the set of adjustable weights.

* * * * *